US012702089B2

(12) United States Patent
Bothe et al.

(10) Patent No.: US 12,702,089 B2
(45) Date of Patent: Aug. 11, 2026

(54) METHOD, APPARATUS AND SYSTEM FOR AGRICULTURAL VEHICLE MONITORING

(71) Applicant: DEERE & COMPANY, Moline, IL (US)

(72) Inventors: Mahesh S. Bothe, Pune (IN); Sagar V. Jadhav, Pune (IN)

(73) Assignee: DEERE & COMPANY, Moline, IL (US)

( * ) Notice: Subject to any disclaimer, the term of this patent is extended or adjusted under 35 U.S.C. 154(b) by 328 days.

(21) Appl. No.: 18/581,078

(22) Filed: Feb. 19, 2024

(65) Prior Publication Data

US 2024/0276914 A1 Aug. 22, 2024

Related U.S. Application Data

(60) Provisional application No. 63/485,962, filed on Feb. 20, 2023.

(51) Int. Cl.
*A01D 41/127* (2006.01)
*A01D 45/10* (2006.01)

(52) U.S. Cl.
CPC ......... *A01D 41/1276* (2013.01); *A01D 45/10* (2013.01)

(58) Field of Classification Search
CPC .. A01D 41/1276; A01D 45/10; A01B 79/005; A01B 17/002; A01B 41/06; A01B 63/1112; A01B 33/16; G06T 7/0002; G06T 2207/30188
See application file for complete search history.

(56) References Cited

U.S. PATENT DOCUMENTS

| | | | | |
|---|---|---|---|---|
| 9,861,040 B2 | | 1/2018 | Bonefas | |
| 10,371,561 B2 | | 8/2019 | Darr et al. | |
| 11,094,113 B2 | | 8/2021 | Mundy et al. | |
| 2004/0264761 | A1* | 12/2004 | Mas | G06T 7/593 382/154 |
| 2005/0286757 | A1* | 12/2005 | Zitnick | G06V 10/10 382/154 |
| 2007/0071311 | A1* | 3/2007 | Rovira-Mas | G06T 7/70 382/104 |
| 2007/0086646 | A1* | 4/2007 | Yang | G06V 10/10 382/154 |
| 2009/0180682 | A1* | 7/2009 | Camus | H04N 13/239 382/154 |
| 2010/0063692 | A1* | 3/2010 | Madsen | A01D 43/073 348/46 |
| 2012/0087573 | A1* | 4/2012 | Sharma | G06V 20/52 382/154 |
| 2013/0211658 | A1* | 8/2013 | Bonefas | A01D 43/087 701/28 |
| 2013/0278596 | A1* | 10/2013 | Wu | H04N 13/271 345/419 |

(Continued)

*Primary Examiner* — Fernando Alcon

(57) ABSTRACT

A method for monitoring a stereo vision system of an agricultural vehicle comprising: receiving a communication signal relating to a parameter of the agricultural vehicle; acquiring, based on the state signal, an operational image of an agricultural operation of the agricultural vehicle; generating a disparity image from the operational image; determining a disparity of the disparity image; and displaying a disparity indicator relating to the disparity of the disparity image to an operator of the agricultural vehicle.

16 Claims, 8 Drawing Sheets

(56) References Cited

U.S. PATENT DOCUMENTS

| | | | | |
|---|---|---|---|---|
| 2014/0083556 | A1* | 3/2014 | Darr | A01D 43/087 141/95 |
| 2015/0124054 | A1* | 5/2015 | Darr | G01F 25/0084 348/46 |
| 2015/0237790 | A1* | 8/2015 | Redden | A01M 21/02 701/50 |
| 2015/0296202 | A1* | 10/2015 | Zhong | H04N 13/296 348/47 |
| 2015/0342118 | A1 | 12/2015 | Corbett et al. | |
| 2016/0144505 | A1* | 5/2016 | Fong | G05D 1/0274 700/250 |
| 2017/0055446 | A1* | 3/2017 | Nykamp | A01D 43/087 |
| 2017/0169295 | A1* | 6/2017 | Park | G06F 16/739 |
| 2019/0037770 | A1 | 2/2019 | Dugas et al. | |
| 2019/0059206 | A1* | 2/2019 | Stanhope | G10G 5/005 |
| 2019/0150357 | A1* | 5/2019 | Wu | H04N 23/51 |
| 2020/0258215 | A1* | 8/2020 | Kashyap | G06N 20/00 |
| 2021/0015039 | A1* | 1/2021 | Vandike | G06V 20/56 |
| 2021/0117704 | A1* | 4/2021 | Yao | G06T 7/73 |
| 2022/0124962 | A1* | 4/2022 | Long | G06V 20/56 |

* cited by examiner

Disparity Image

Binarization $$\text{Output} = \begin{cases} 1, & \text{input} < 0 \\ 0, & \text{input} < 0 \end{cases}$$

Pixel wise spatial accumulation

Divide image into small cells

DH for each Cell $$DH = \frac{\text{Sum of Pixel in Cell}}{W*H*\text{Threshold1}}$$

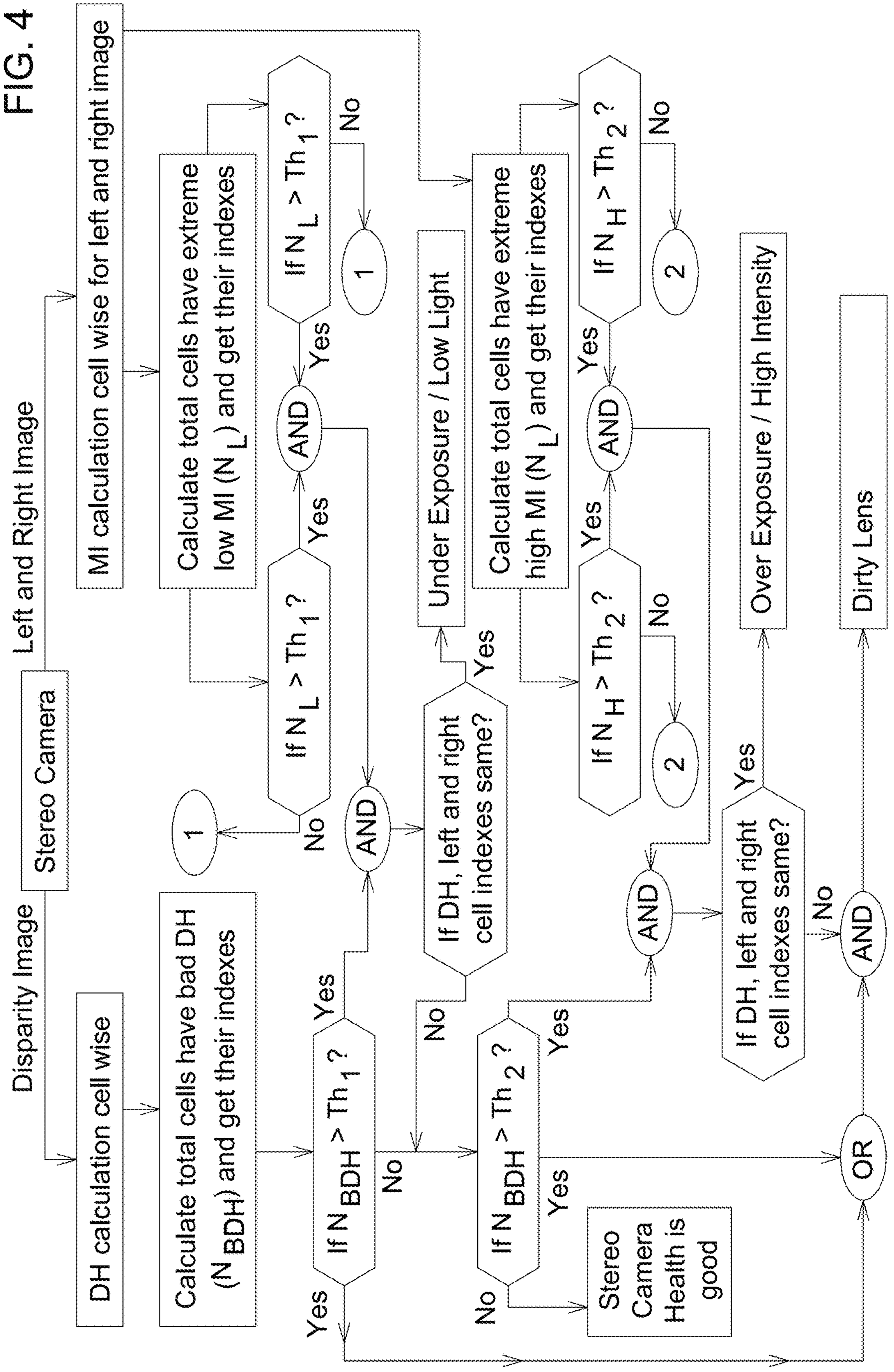

FIG. 4
Stereo Camera
Disparity Image
Left and Right Image
DH calculation cell wise
MI calculation cell wise for left and right image
Calculate total cells have bad DH ($N_{BDH}$) and get their indexes
Calculate total cells have extreme low MI ($N_L$) and get their indexes
If $N_L > Th_1$ ?
If $N_L > Th_1$ ?
1
1
If $N_{BDH} > Th_1$ ?
AND
AND
If DH, left and right cell indexes same?
Under Exposure / Low Light
Calculate total cells have extreme high MI ($N_L$) and get their indexes
If $N_{BDH} > Th_2$ ?
If $N_H > Th_2$ ?
If $N_H > Th_2$ ?
AND
2
2
Stereo Camera Health is good
AND
If DH, left and right cell indexes same?
Over Exposure / High Intensity
OR
AND
Dirty Lens
Yes
No

METHOD, APPARATUS AND SYSTEM FOR AGRICULTURAL VEHICLE MONITORING

FIELD OF THE DISCLOSURE

The present disclosure relates to a method, apparatus and system for monitoring the performance of a stereo vision system for an agricultural vehicle.

BACKGROUND

In many applications, it can be important to know an operating state of an agricultural work machine. Current systems combine values from several sensors to determine the operating state of the machine that may vary over time to automatically control components of the work machine. However, for numerous reasons signals from one such sensor can be less dependable than those from another sensor, be it due to the type of sensor, operating state, conditions, failure or signal degradation. For example, some sensors, e.g., trash or leaf sensors, are less dependable in high throughput or high moisture conditions than in low throughput or dry conditions. Further, some agricultural vehicles use cameras or other imaging devices in an outdoor work area, such as an agricultural field to collect image data of an agricultural operation. The imaging devices may be used outside and thus subject to transitory sunlight, shading, dust, reflections or other lighting conditions that can temporarily disrupt proper operation of the imaging devices and potentially produce errors. For example, the quality of captured images and point cloud generated by stereo camera get affected by several factors including dust or dirt on a lens of the imaging device, extreme lighting conditions and under/over exposure.

SUMMARY

A method for monitoring a stereo vision system of an agricultural vehicle comprising receiving a communication signal relating to a parameter of the agricultural vehicle; acquiring, based on the state signal, an operational image of an agricultural operation of the agricultural vehicle; generating a disparity image from the operational image; determining a disparity of the disparity image; and displaying a disparity indicator relating to the disparity of the disparity image to an operator of the agricultural vehicle.

A system for monitoring an agricultural vehicle comprising: a communication network configured to relay communication signals relating to a parameter of the agricultural vehicle; a stereo vision system for generating an operational image of an agricultural operation of the agricultural vehicle; and a controller for receiving the communication signal and the operational image, the controller generating, based in part on the communication signal, a disparity image from the operational image and providing a disparity indicator relating to the disparity image to an operator of the agricultural vehicle.

An apparatus for monitoring an agricultural vehicle comprising: a communication network configured to relay communication signals relating to a parameter of the agricultural vehicle; a stereo vision system for generating an operational image of an agricultural operation of the agricultural vehicle; and a controller for receiving the communication signal and the operational image, the controller generating, based in part on the communication signal, a disparity image from the operational image and providing a disparity indicator relating to the disparity image to an operator of the agricultural vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 4 is a flow chart for monitoring and diagnosing a stereo vision system;

DETAILED DESCRIPTION

Figure 1:
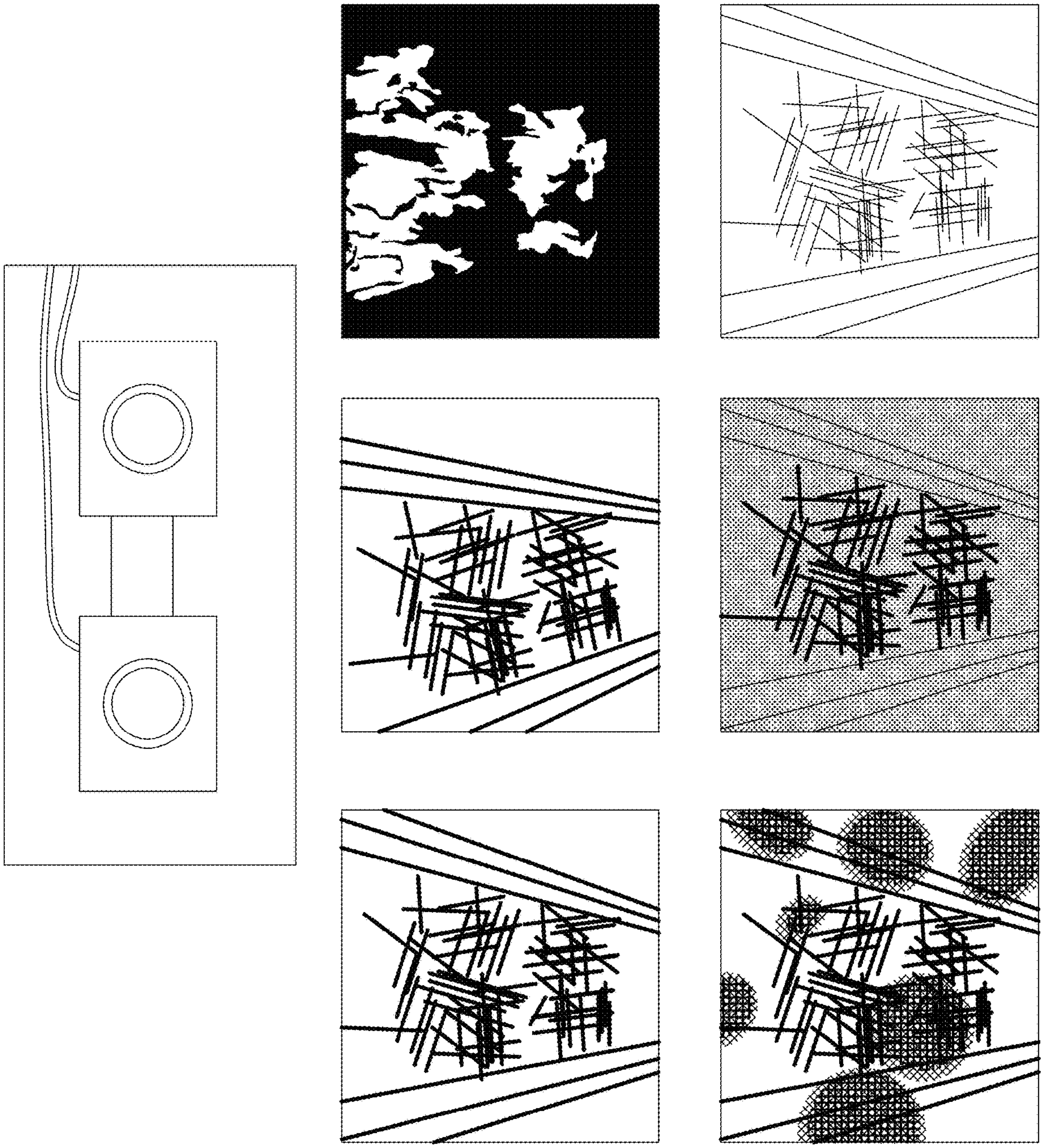
FIG. 1 shows examples of a stereo camera having left and right cameras, images from the respective cameras, a disparity image and a camera with a dirty lens and in over/under exposure situations.

For certain agricultural operations, a stereo camera-based system is used to generate a 3-D representation of aspect of the agricultural operation, generally in the form of a point cloud, using disparity and/or disparity points. If the generated disparity has sparse distribution, then it ultimately affects the validity and/or accuracy of the point cloud by creating gaps or holes. In other words, sparsity in disparity or poor disparity health can indicate an abnormality or error in the operation of a stereo vision system. For example, and with respect to FIG. 1, the quality of captured images and point cloud generated by stereo camera may be impacted by several factors including dust or dirt on a lens of the imaging device, extreme lighting conditions and under/over exposure.

In one example, this disclosure provides a stereo health diagnosis method based on sparsity in disparity. This disclosure proposes using the disparity health (DH), mean intensity (MI) of left and right stereo images to monitor the heath of stereo camera (see FIG. 1). Disparity health and mean intensity calculation involves the temporal and spatial averaging of sparse pixels (i.e., pixel intensity) in each frame. Using spatial averaging we can localize the health problem in proposed solution. Our proposed solution Real-time which can be easily integrated in any existing stereo-based application.

Figure 2:
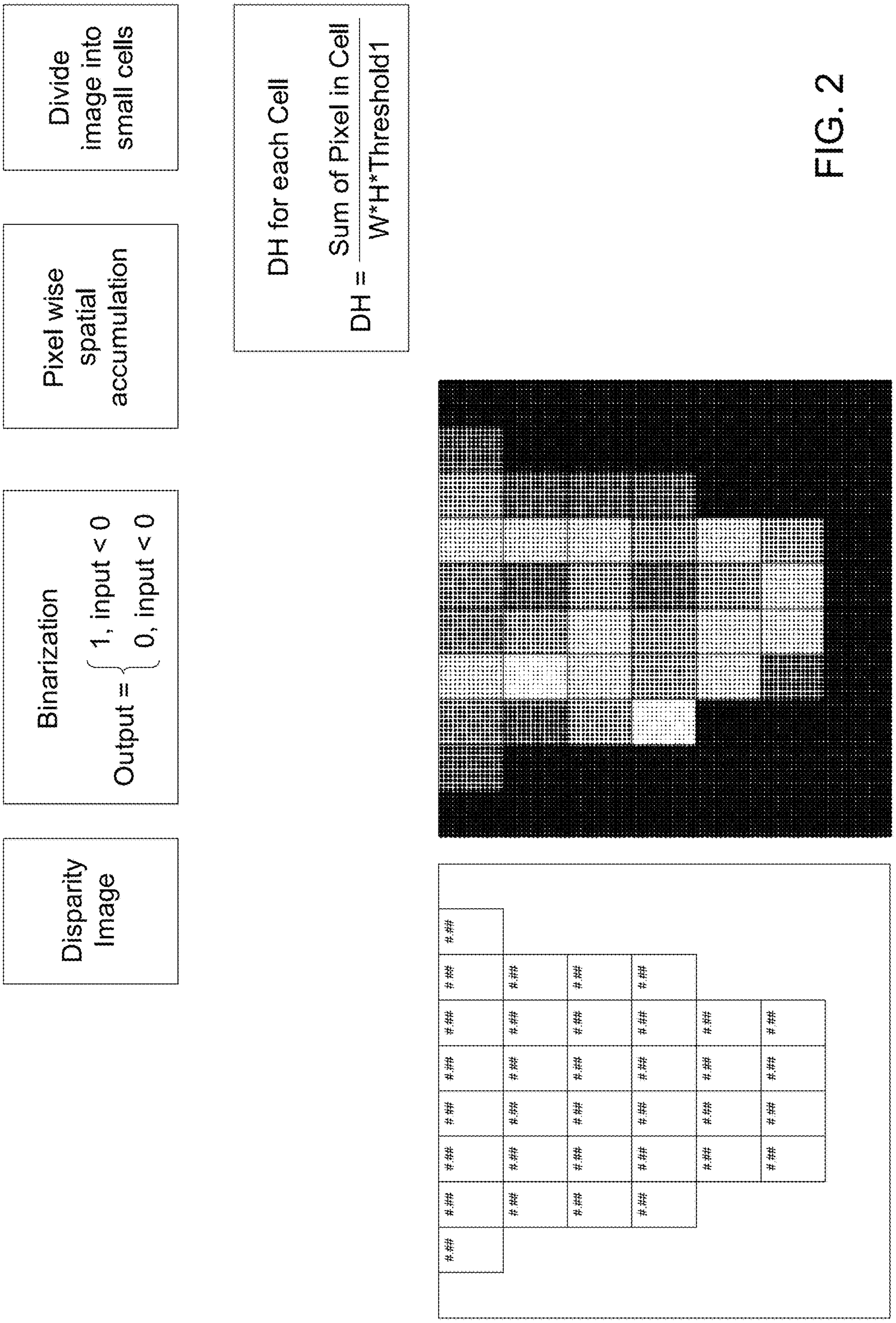
FIG. 2 is a diagram of a disparity health computation for a given disparity image.

With respect to FIG. 2, an example for monitoring the health of a stereo vision system utilizing disparity health is disclosed. Disparity health is calculated by converting disparity image into binary image based on the threshold and add binary image in temporal and spatial domain. As show in FIG. 2, the image results are divided into small cells and a disparity health value is calculated for each cell. Cell wise division of disparity health and spatial accumulation helps to localize the health problems in image. Low disparity health value for cell may indicate problems which need further diagnosis.

Figure 3:
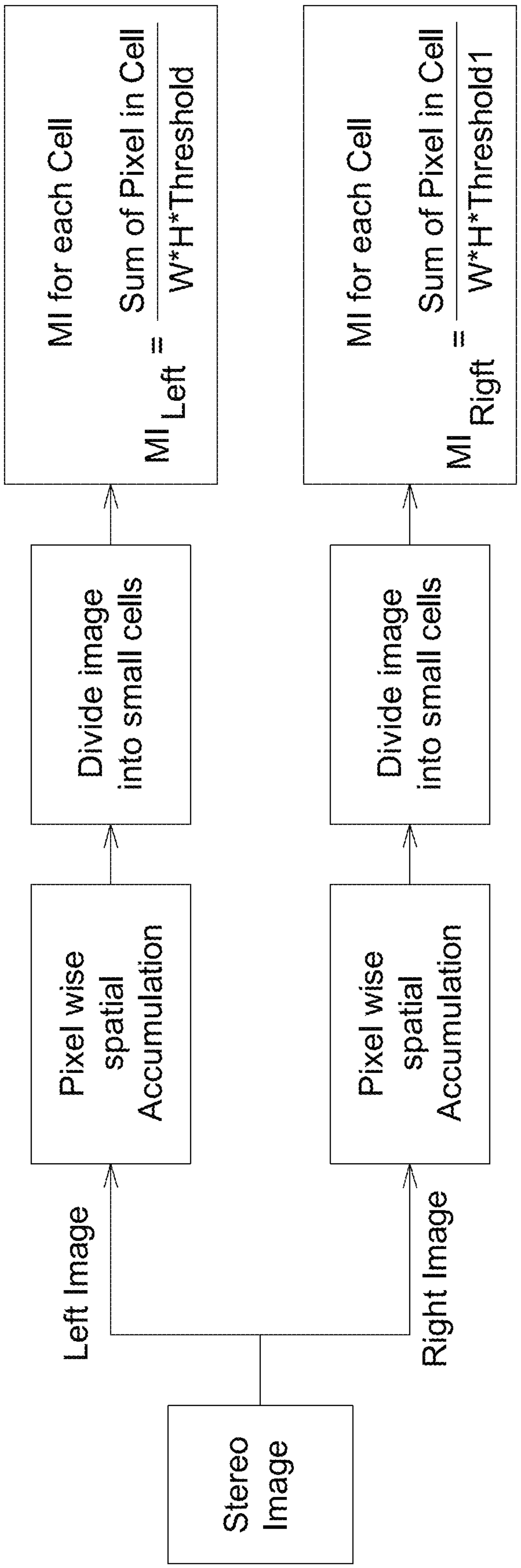
FIG. 3 is a flow chart for a mean intensity computation for left and right images.

With respect to FIG. 3, the accumulated mean intensity is used with the DH to get the final diagnosis status of the stereo camera. For mean intensity calculation, it is proposed to accumulate (add) image in temporal and spatial domain. The image results are then divided into small cells and calculate mean intensity value for each cell. This operation is performed on both a left and right image. Very low and very high mean intensity values in both images for same cells indicates problem which needs further diagnosis.

With respect to FIG. 4, an overall diagnosis algorithm is provided showing a "dirty lens" diagnosis, an under exposure (or low light) diagnosis, an over exposure (high intensity) diagnosis and a good health diagnosis.

In another example, a method, apparatus and system for monitoring the performance of a stereo vision system for a specific agricultural vehicle, e.g., a sugarcane harvester, is provided. In this specific example, a stereo vision system and CAN bus signal may be used together to improve disparity health, improve yield volume estimations, and/or diagnose operation problems of the agricultural vehicle. Certain disparity health calculation methods are easily affected or otherwise impacted by the physical view or environment around the stereo camera. For example, on the sugarcane harvester, a cane yield monitoring system is utilized with an elevator of the sugarcane harvester. The cane yield monitoring system may generate poor disparity images (and disparity health) when the elevator is empty due to a mesh-like structure of elevator and/or elevator base. This disclosure proposes uses the existing common area network signals (CAN) of the machine to determine certain factors that affects the disparity health calculation. In one example, the CAN signal—via associated sensors—may provide a direct or indirect indication of the state of the elevator (moving or steady). Further, the CAN signal may provide an indication of whether the elevator is empty or not by using a rotor pressure or other sensor signal relating to the operation of the sugarcane harvester. Still further, the CAN signal may provide a direct or indirect indication of vehicle yaw and whether or not vehicle yaw is stable/unable. An unstable vehicle yaw may indicate light exposure will change due to turning of the elevator and cause under/over exposure situations.

Figure 5:
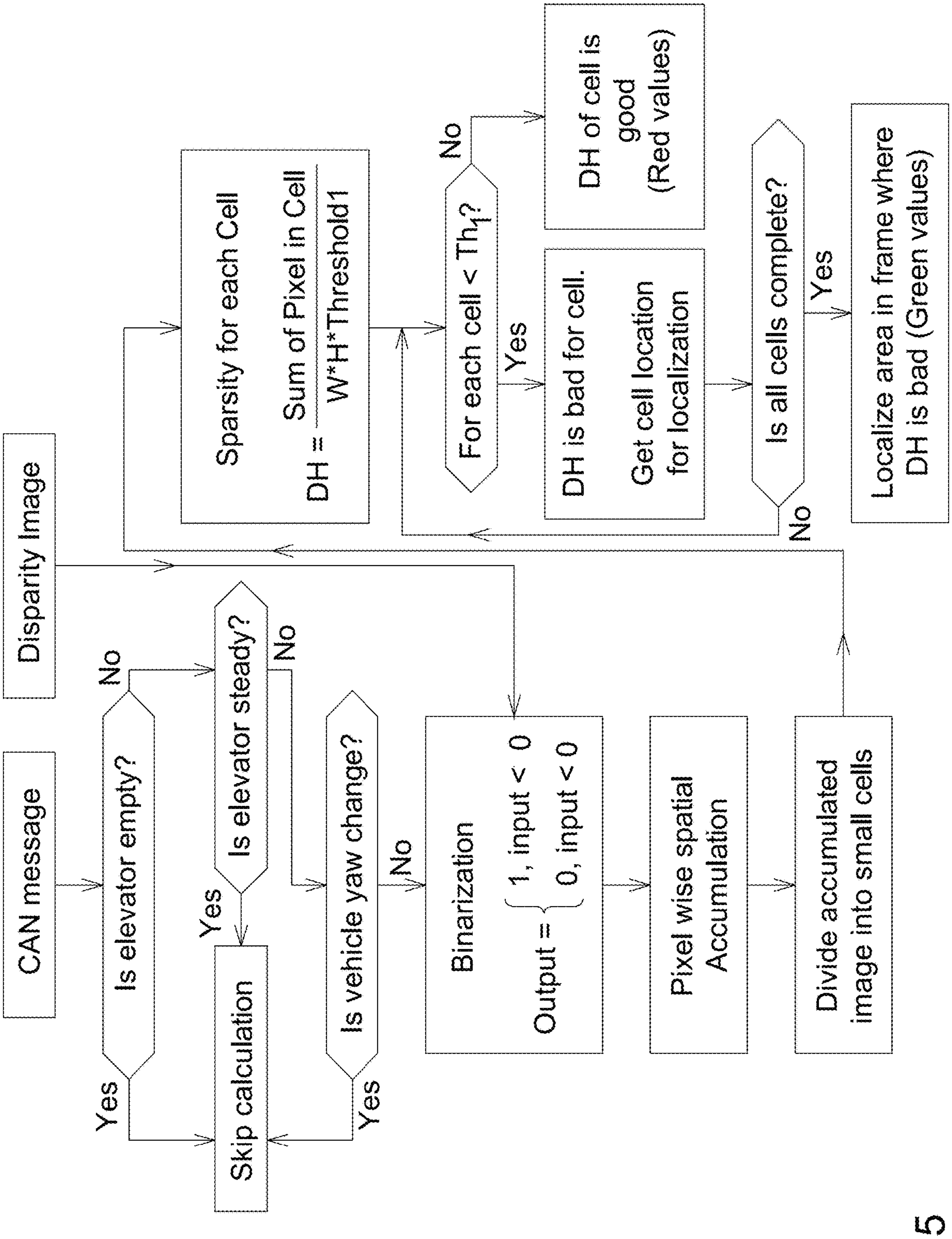
FIG. 5 is a flow chart for monitoring and diagnosing a stereo vision system utilizing a CAN signal from an agricultural vehicle.

With respect of FIG. 5, in this example, the CAN signal is used to improve the sparsity in disparity (i.e., disparity health) calculation. FIG. 5 further introduces the step of considering the elevator state and/or skipping a disparity health calculation due physical or environmental conditions described above. Also, to localize the problems in sparsity, it is possible further divide the accumulated results into smaller cells and calculate disparity health value for those cells. After these initial steps, and as mentioned previously, disparity health is computed by converting a disparity image into binary cells based on an identified disparity threshold. If a disparity value is positive or meets a threshold then a given cell is mark as 1 or if the disparity value is negative or does not meet a threshold the given cell is marked as 0. Subsequently, the binary images in a temporal domain may be combined or added.

Exemplary Sugarcane Harvester

Figure 6:
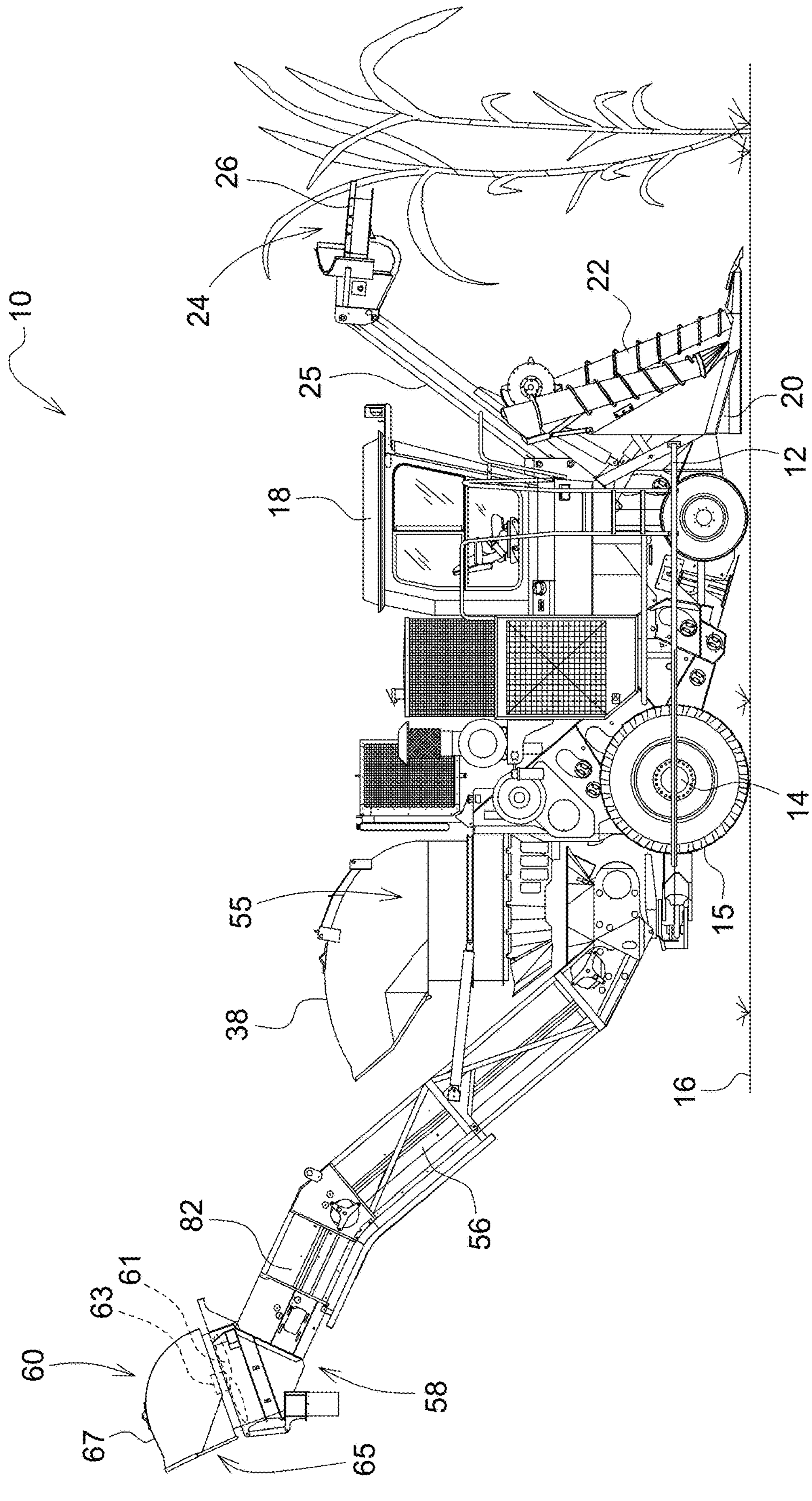
FIG. 6 is a side view of an agricultural working machine in the form of a sugarcane harvester.
Figure 7:
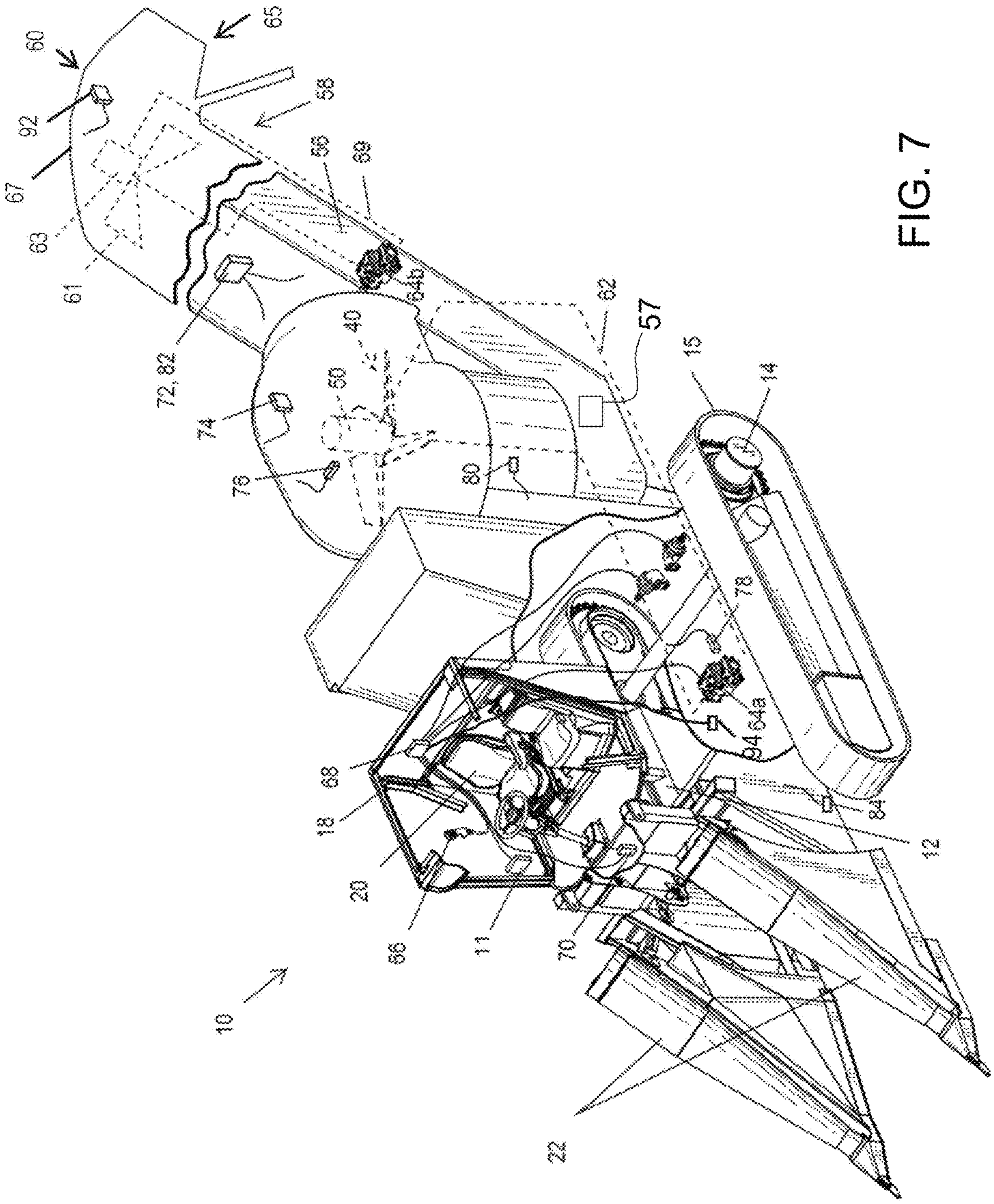
FIG. 7 is a perspective view of the sugarcane harvester shown in FIG. 6.

FIGS. 6-7 illustrates a harvester 10, such as a sugarcane chopper harvester, which includes a prime mover (not shown), such as an internal combustion engine, for providing motive power and a throttle 11 for controlling a speed of the prime mover and thus a ground speed of the harvester 10.

Further, harvester 10 includes a frame 12 supported on wheels 14 having continuous tracks 15, tires, or other traction devices that engage a field 16. The tracks 15 interact directly with the field 16 and are responsible for harvester 10 movement and tractive effort, although in other constructions the harvester 10 is provided only with wheels (rather than tracks as illustrated). An operator's cab 18 is mounted on the frame 12 and contains a seat 19 for an operator. A pair of crop lifters 22 having side by side augers or scrolls is mounted to the front of the frame 12, which operate on opposite sides of a row of crop to be harvested. The crop lifters 22 cooperate with upper and lower knockdown rollers and a base cutter 20 (generally shown in FIG. 6) including counter-rotating discs which cut off the stalks of crop close to the field 16 after being knocked down by the rollers. The crop lifters 22 are configured to lift the sugarcane for feeding into a feed section (not shown). Additionally, the harvester 10 may be equipped with a topper 24 extending from the frame 12 on a boom 25. The topper 24 has a blade or blades 26 for cutting the tops off crop and allowing for easier processing of the remaining crop by the harvester 10.

As generally seen in FIG. 6, the chopper 28 is configured to receive a mat of severed sugarcane from the feed section (not shown). The chopper 28 cuts the crop and the separator 55 receives the cut crop from the chopper 28 and generally separates the cut crop by way of a crop cleaner, which will be described in greater detail below. The crop cleaner may include any suitable mechanism for cleaning the cut crop, such as a fan (as in the illustrated construction that will be described below), a source of compressed air, a rake, a shaker, or any other mechanism that discriminates various types of crop parts by weight, size, shape, etc. to separate extraneous plant matter from billets. The separator 55 may include any combination of one or more of a cleaning chamber, a cleaning chamber housing, a crop cleaner such as a fan 40, a fan enclosure, a motor 50 driving the fan 40, a hood 38 having an opening 54, and a centrifugal blower wheel 46.

The separator 55 is coupled to the frame 12 and located downstream of the crop lifters 22 for receiving cut crop from the chopper 28. The chopper 28 includes counter-rotating drum cutters 30 with overlapping blades for cutting the stalks of crop, such as cane C, into billets B, which are pieces of the stalk. In other constructions, the chopper 28 may include any suitable blade or blades for cutting the stalks of crop. The crop also includes dirt, leaves, roots, and other plant matter, which will be collectively referred to herein as extraneous plant matter, which are also cut in the chopper 28 along with the cane C. The chopper 28 directs a stream of the cut crop (cut stalks, or billets B, and cut extraneous plant matter) to the cleaning chamber, which is generally defined by the cleaning chamber housing, the fan enclosure, and/or the hood 38, all of which are coupled to the frame 12 and located just downstream of the chopper 28 for receiving cut crop from the chopper 28. The fan enclosure is coupled to the cleaning chamber housing and may include deflector vanes 31.

The hood 38 is coupled to the fan enclosure and has a domed shape, or other suitable shape, and includes an opening 54 angled out from the harvester 10 and facing slightly down onto the field 16. In some constructions, the opening 54 may be generally perpendicular to the drive shaft. The hood 38 directs cut crop through the opening 54 to the outside of the harvester 10, e.g., for discharging a portion of cut crop removed from the stream of cut crop back onto the field 16 (as will be described in greater detail below).

Mounted for rotation in the cleaning chamber is the fan 40. For example, the fan 40 may be in the form of an extractor fan having axial flow fan blades (not shown) radiating out from, and joined to, a hub (not shown). In the illustrated construction, the fan 40 (or other crop cleaner) is configured to draw air and extraneous plant matter from the cleaning chamber. In other constructions, the fan 40 (or other crop cleaner) may be configured to blow rather than extract, i.e., to blow or push the air through the cleaning chamber to clean the crop. The fan 40 may include other types of fans with other types of blades, such as a centrifugal fan, amongst others. The centrifugal blower wheel may be mounted for rotation with the fan 40 radially inwardly of the deflector vanes. For example, a plurality of generally right-angular blower blades may be fixed to the underside of the centrifugal blower wheel radiating out therefrom.

The motor 50, such as a hydraulic motor, includes a drive shaft operatively coupled to drive the fan 40. For example, the drive shaft may be keyed to the hub or operatively coupled in other suitable ways to drive the fan 40. The motor 50 may also be operatively coupled to drive the centrifugal blower wheel in a similar manner. In other constructions, the motor 50 may be electric, pneumatic, or may include any other suitable type of motor, an engine, or a prime mover to drive the fan 40 and/or the centrifugal blower wheel 46.

Referring again to FIGS. 6-7, an elevator 56 is coupled to the frame 12 for receiving cleaned crop from the separator 55. The elevator 56 terminates at a discharge opening 58 (or outlet) elevated to a height suitable for discharging cleaned crop into a collection receptacle of a vehicle (not shown), such as a truck, wagon, or the like following alongside the harvester 10. A secondary cleaner 60 may be located adjacent the discharge opening 58 for cleaning the crop a second time before being discharged to the vehicle. For example, the secondary cleaner 60 may include a fan, compressed air, a rake, a shaker, or other suitable device for cleaning the crop and ejecting the cleaned crop out a secondary cleaner outlet 65.

Briefly, the billets B are generally separated as described in U.S. Patent Publication No. 20190037770, jointly owned with the present application, the entire contents of which are incorporated herein by reference. The billets are separated from the extraneous plant matter in a cleaning chamber as the fan 40 draws the generally lighter extraneous plant matter into the hood 38 and out the opening 54. All the cut crop directed through the opening 54, which is ejected back onto the field 16, is referred to herein as residue. Residue typically includes primarily the extraneous plant matter (which has generally been cut) and may include some billets. The cleaning chamber housing directs the cleaned crop to the elevator 56. The cleaned crop typically includes primarily billets, although some extraneous plant matter may still be present in the cleaned crop. Thus, some extraneous plant matter may be discharged with the billets B from the discharge opening 58. Extraneous plant matter discharged from the discharge opening 58 to the vehicle is referred to herein as trash.

A first hydraulic circuit 62 for powering the motor 50 is operatively coupled thereto and a second hydraulic circuit 69 for powering the motor 63 is operatively coupled thereto. In other constructions, the circuits 62, 69 may be electric, pneumatic, may comprise mechanical linkages, etc. In other constructions, the motors 50, 63 may be powered by the same hydraulic circuit including controllable valves. A detailed description of one example of a hydraulic circuit for a harvester fan can be found in U.S. Patent Publication No. 2015/0342118, jointly owned with the present application, the entire contents of which are incorporated herein by reference. For example, the hydraulic circuits 62, 69 are closed-loop hydraulic circuits, which are powered by a pump 64*a*, 64*b*, respectively. Each pump 64*a*, 64*b* may be driven by the prime mover (not shown) of the harvester 10 or other power source.

With reference to FIG. 7, the harvester 10 also includes an operator interface 66 (e.g., a display, buttons, a touch screen, a graphical user interface, any combination thereof, or the like) with which a user can input settings, preferences, commands, etc. to control the harvester 10. In another example, operator interface 66 may also include a working state monitor 100, such as a harvest activity or machine activity monitor. Where working state monitor 100 is a harvest activity monitor, the monitor—can accumulate and display information relating to at least: harvesting time and distance traveled; headland turnaround time and distance traveled; time and distance traveled on the road; harvester idle time while waiting for transport or other; total time that engine is running and distance traveled. Such information, in combination or in part, can help the operator identify areas of inefficiencies and take corrective action to reduce among other things logistics cost.

The operator interface 66 (including the working state monitor 100 is operatively coupled with a control unit 68, such as a microprocessor-based electronic control unit or the like, for receiving signals from the operator interface 66 and from several sensors and for sending signals to control various components of the harvester 10 (examples of which will be described in greater detail below). Signals, as used herein, may include electronic signals (e.g., by circuit or wire), wireless signals (e.g., by satellite, internet, mobile telecommunications technology, a frequency, a wavelength, Bluetooth®), or the like. The control unit 68 may include a memory and programming, such as algorithms. The harvester 10 also includes a global positioning system 70 operatively connected to send signals to the control unit 68. The aforementioned sensors may include a yield sensor 72, a billet loss sensor 74, a crop processing sensor 75, a primary cleaner sensor 76, a secondary cleaner sensor 92, a load sensor 78, a moisture sensor 80, temperature sensor 88, a relative humidity sensor 86, a trash sensor 82, and a ground speed sensor 84. The control unit 68 is programmed to include a monitoring system that monitors harvester functions, switch states, ground speed, and system pressures as will be described in greater detail below. Exemplary control unit inputs:

Elevator sensor 57 for detecting at least a pressure in pounds per square inch on the elevator 56. In another example, the sensor detects a speed of the elevator 56 which may include whether the elevator is in an on or off state. In yet another example, the elevator sensor 57 detects a belt deflection of elevator 56, the amount of belt deflection determined using a distance measurement detected by a camera or strain gauges associated with the belt of elevator 56.

Chopper sensor 94 (not shown) for detecting at least a pressure or force in pounds per square inch on a chopper 28 and/or the operation of an associated chopper actuator 208. In another example, the sensor detects a speed of the counter-rotating drum cutters (not shown) or other type of chopper. In yet another example, chopper 28 is powered by an electric drive and thus chopper sensor 94 may be configured to sensor motor current of the electric drive. The sensed motor current would serve as a proxy for torque or load. Other torque or load sensing techniques may also be utilized to sense parameters of chopper 28.

Base cutter sensor 21 (not shown) for detecting at least a pressure in pounds per square inch on a base cutter 20 and/or the operation of an associated base cutter actuator 202. In another example, the sensor detects speed of the counter-rotating discs, or other cutting device, of the base cutter 20. In yet another example, base cutter 20 is powered by an electric drive and thus base cutter sensor 21 may be configured to sensor motor current of the electric drive. The sensed motor current would serve as a proxy for torque or load. Other torque or load sensing techniques may also be utilized to sense parameters of base cutter 20.

Yield sensor 72 is coupled to the elevator 56 and sends at least a crop yield signal to the control unit 68 corresponding to an amount (e.g., a mass, a volume or pressure) of crop being discharged from the discharge opening 58 or on the floor of the elevator 56. In one example, the yield sensor 72 is a vision or camera-based yield sensing system which includes a stereo camera and an artificial light source permitting image classification to estimate crop yield. Crop yield may include leaf trash content, billet content, root balls and other components. The resulting crop yield may be provided to the operator in the cab and—via telemetry—to other key stakeholders such as remote harvest managers, mill material planners and agronomists. In yet another example, the yield sensor 72 is a vision or camera-based yield sensing system that is not solely associated with the elevator 56. In one example, the yield sensor is a forward-looking camera system that estimates yield using mean density or reflection intensity determined by image recognition or radar sensing technologies. In another example, the yield sensor 72 is located more forwardly in the material flow to be upstream of the material flow and is independent of the elevator 56.

Billet loss sensor 74 may include one or more accelerometers and/or any sensor that measures displacement or strain, or the like. The billet loss sensor 74 is associated with the separator 55, or more specifically coupled to the separator 55. For example, the billet loss sensor 74 may be associated with, or coupled to, a cleaning chamber housing, a fan enclosure, the hood 38, the fan 40, the fan blades, the hub, a centrifugal blower wheel, a right angular blower blades, the drive shaft, etc., or any of the associated structures. In the illustrated construction, the billet loss sensor 74 is coupled to the hood 38 (FIG. 6); however, it can be attached to a sounding plate in the exhaust of the fan 40 or other suitable locations within or proximate to the stream of crop flow through the harvester 10. The billet loss sensor 74 is configured for sending a signal to the control unit 68 corresponding to each billet passing through the separator 55 and, more specifically, out the opening 54. For example, the billet loss sensor 74 includes an accelerometer that detects the impact of a billet hitting the fan 40 and/or a housing part, such as the hood 38. In other constructions, the billet loss sensor 74 may include a piezoelectric sensor or employ another suitable sensing technology. The billet loss sensor 74 sends a signal to the control unit 68 each time a billet is detected. The control unit 68 records and counts the billets and may associate the billet signal data with a time, a location (e.g., from the GPS 70), etc.

Crop Processing Sensor 75 (not shown) is a crop processing result sensor for detecting the quality of or damage to the crop—such as damage to billets—as the crop passes through the harvester such as, in one example, along elevator 56. In another example, the crop processing sensor detects ratoon damage, including the quality of the cut (e.g., cut loss), stubble height, and lifted off/in ground. Sensor 75 may include vision technology (e.g., a camera) disposed proximate the elevator 56 and/or the discharge opening 58 and sending a signal to the control unit 68 corresponding to total damaged billets discharged from the discharge opening 58 and/or a number of damaged billets being discharged from the discharge opening 58. The sensor 75 may quantify the number of damaged billets as an absolute amount or as a percentage of the total passing through the discharge opening 58.

Primary cleaner sensor 76 may be associated with or coupled to the separator 55. In one example, the separator 55 includes a fan 40, and, accordingly, the sensor 76 may be coupled to, for example, the blades, the motor 50, the drive shaft, etc., or to any suitable location adjacent the fan 40. For example, the primary cleaner sensor 76 may include magnets, proximity sensors, Hall Effect sensors, etc., to count revolutions of the blades, the drive shaft, or other part of the fan 40 and send signals to the control unit 68 corresponding to, and used to determine, the fan speed. In another example, the primary cleaner sensor 76 includes pressure or torque sensors associated with the motor 50, wherein the sensors measure speed and pressure to calculate the total power of the fan 40. The primary cleaner sensor 76 may also include other suitable sensing technologies for determining operation characteristics of the cleaner, including where the cleaner is a separator 55 having a fan speed.

Secondary cleaner sensor 92 may be associated with, or coupled to, the secondary cleaner 60. The secondary cleaner 60 may be, for example, a fan within a secondary cleaner hood 67 and the sensor 92 may be coupled to, for example, the blades 61, the motor 63, the drive shaft, etc., or to any suitable location adjacent the fan. For example, the secondary cleaner sensor 92 may include magnets, proximity sensors, Hall Effect sensors, etc., to count revolutions of the blades, the drive shaft, or other part of the fan and send signals to the control unit 68 corresponding to, and used to determine, the fan speed. In another example, the secondary cleaner sensor 92 includes pressure or torque sensors associated with the motor 63, wherein the sensors measure speed and pressure to calculate the total power of the fan. The secondary cleaner sensor 92 may also include other suitable sensing technologies for determining fan speed.

Moisture sensor 80 is positioned to detect moisture of the crop. Crop having more moisture is heavier and harder to draw through the separator 55 and therefore requires more power from the fan 40. The moisture sensor 80 may include a near infrared, capacitive, radar or microwave type sensors or other suitable moisture-detecting technologies and may work in cooperation with a humidity sensor 86 and/or a temperature to indicate conditions of the cut crop material prior to its being processed (i.e., threshed, cleaned, or separated) in the harvester 10. For example, the moisture sensor 80 is disposed on the harvester 10 and may be positioned in the chopper 28, in the separator 55, and/or in the elevator 56 and, more specifically, in any of the components of the harvester 10 associated therewith as described above. In the illustrated construction, the moisture sensor 80 is disposed in the separator 55 and, more specifically, in the hood 38. The moisture sensor 80 sends a signal to the control unit 68 corresponding to a level of moisture in the crop.

Trash sensor 82 may include vision technology (e.g., a camera) disposed proximate the elevator 56 and/or the discharge opening 58 and sending a signal to the control unit 68 corresponding to total yield discharged from the discharge opening 58 and/or an amount of trash being discharged from the discharge opening 58. The trash sensor 82 may quantify the amount of trash as an absolute amount or as a percentage of total mass or as a percentage of total volume through the discharge opening 58. The trash sensor 82 may be disposed in the elevator 56 or other suitable locations within or proximate to the discharge stream of crop from at least one of the primary cleaning fan 40 or secondary cleaning fan. The trash sensor 82 may include other sensing technologies for determining the amount of trash being discharged from the discharge opening 58. In one example, the amount of trash quantified by trash sensor 82 is representative of leaf impurities as an absolute amount or as a percentage of total volume or total mass within the material on elevator 56 and/or mineral impurities that may impact the subsequent milling process.

Ground speed sensor 84 may be associated with ground speed actuator 212 and may include a speedometer, a radar sensor, a velocimeter such as a laser surface velocimeter, a wheel sensor, or any other suitable technology for sensing vehicle speed, is configured to send a ground speed signal to the control unit 68 corresponding to the speed of the harvester 10 with respect to the field 16. It is recognized by one of skill in the art that the ground speed sensed by ground speed sensor 84 is different than the ground speed sensed by GPS 70. However, a ground speed signal could be approximated by the GPS 70 after accounting for measurements issues, wheel slip, etc.

Load sensor 78 senses a load on the separator 55 and/or the operation of an associated separator actuator 210. For example, the load sensor 78 may measure a load on the motor 50 and may include any suitable type of sensor for the type of motor employed, e.g., electric, pneumatic, hydraulic, etc. In some constructions, the load sensor 78 may include a strain gage(s) for measuring a torque load or an amp meter for measuring an electrical load. The load on the motor 50 may also be measured indirectly, such as by measuring a load on the fan 40 and/or a centrifugal blower wheel. In some constructions, such as the illustrated construction employing a motor 50, the load sensor 78 may include a pressure transducer, or other pressure sensing technology, in communication with the hydraulic circuit 62 for measuring pressure within the circuit 62. For example, the load sensor 78 may be coupled to the motor 50 or to the pumps 64*a*, 64*b* or anywhere along the circuit 62 to measure the associated pressure in the circuit 62. The load sensor 78 sends load signals to the control unit 68. The load sensor 78 measures a baseline load, or lower load limit, when the harvester 10 is running and no crop is being cut, and a current (or present) load when crop is being cut.

Lens Cleanliness Indicator 90 may include a sensor for determining how dirty the camera is in the yield sensor 72 and how much, if any, cleaning is required. In another example, the lens cleanliness indicator 90 senses how the dirty the camera using a visual flow reading.

Signals from the sensors include information on environmental variables such as temperature, relative air humidity, and information on variables controlled by the onboard control unit 68 which may include vehicle speed signals from the ground speed sensor 84, chopper sensor 94, elevator speed sensor 57, base cutter sensor 21, and primary cleaner sensor 76, respectively. Additional signals originate from billet loss sensor 74, load sensor 78, trash sensor 82, lens cleanliness indicator 90, secondary cleaner sensor 92 and various other sensor devices on the harvester such as a yield sensor 72 and crop moisture sensor 80.

A communications circuit directs signals from the mentioned sensors and an engine speed monitor, flow monitoring sensor, and other microcontrollers on the harvester to the control arrangement 155. Signals from the operator interface 66 are also directed to the control arrangement 155. The control arrangement 155 is connected to actuators 202, 204, 206, 208, 210, 212 for controlling adjustable elements on the harvester 10.

Exemplary Crop Yield Sensing System

Figure 8:
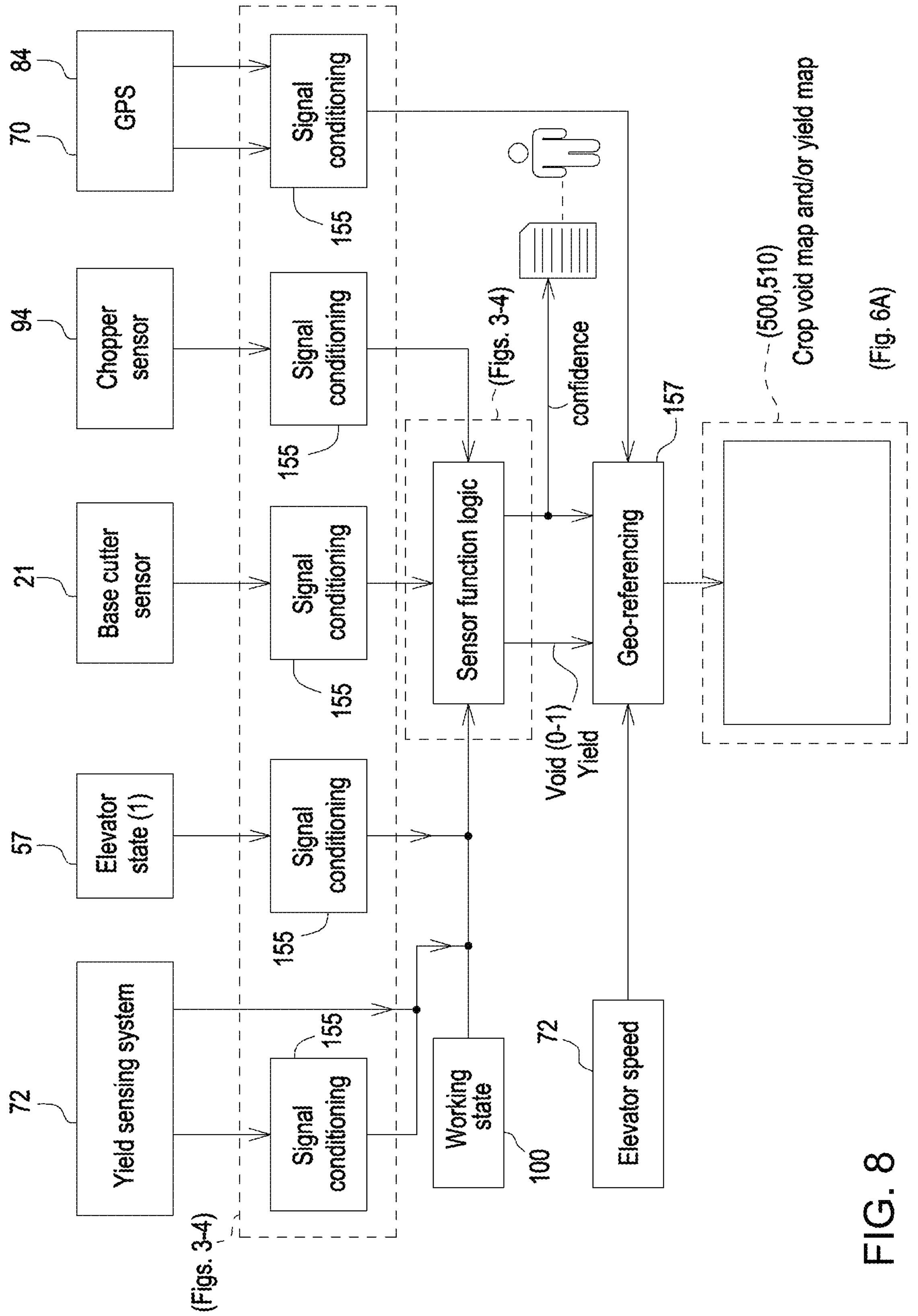
FIG. 8 is a schematic diagram of a sugarcane harvester control system.

Referring to FIG. 8, a harvester 10 may further comprise, either individually or in combination with the void crop plant detection system, a crop yield sensing system for detecting crop yield during operation of the harvester 10. The crop yield system may include the previously mentioned control arrangement subsystem 155, sensor fusion logic circuit subsystem 156 and georeferencing subsystem 157. In this example, the system for detecting crop yield information relies on a combination of a yield sensor 72 and the fusion of existing sugarcane harvester sensors (as discussed previously) to determine and map crop yield(s) during harvest of the sugarcane as shown in the map 500 of FIG. 5.

In one example, a yield sensor 72 on a harvester is combined with existing harvester sensors using the previously described sensor fusion techniques to generate improved yield data. The yield sensor 72 suffers from certain disadvantages including reliance on operation of the elevator 56 to properly associate sensed yield to location. Operators commonly start and stop the operation of the elevator 56 during harvest for a variety reasons, including starting and finishing a row or changing a wagon. The yield sensor 72 also measures volume based on the visible surface(s), which leads to imprecise measurements during high-flow situations where material presentation is highly variable. Other disadvantages include measurement delay and measurement bias or errors. However, these disadvantages may be lessened, and higher quality inferred yield data generated, by using the data from the existing sensors in combination with the yield sensor 72 sensing system. The existing sensors used may comprise the ground speed sensor 84, chopper sensor 94 and base cutter sensor 21. The sensor signals are then used as inputs to a sensor inference algorithm to generate inferred yield data; which in turn can be used as trend data and aligned with the actual yield data from the yield sensor 72.

However, if a yield sensor 72 is not present on a harvester, fusion of existing sensor data can be combined to make an inferred yield (thus being converted from relative to absolute measurement). Optionally, the existing sensor data may be combined with ground truth sampling from manually cutting and weighing sugarcane billets in small, designated areas of the field 16 and including the results in a computer average. In this example, where no yield sensor 72 is provided, existing harvester sensor data is generated from harvester sensors including but not limited to the existing ground speed sensor 84, chopper sensor 94 and base cutter sensor 21, each of which may be used in one or more combinations as inputs to a sensor inference algorithm to determine estimated yield data. The sensor inference algorithm in one example is a classification algorithm utilizing one or more of a neural network or nonlinear regression.

Alternatively, in the example of a mixed fleet wherein one or more harvesters have a yield sensor 72 and one or more harvesters do not have a yield sensor 72, data from a harvester with a yield sensor 72 could be combined with data from a harvester without a yield sensor 72 to infer crop yield data and fill in yield mapping gaps. In this example, some of the machines have no direct yield sensor data and thus produce only relative yield data. The relative yield data is used as a directional indication and aligned with the actual yield data generated by those machines with a yield sensor 72.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. As far as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element (s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. A method for monitoring a stereo vision system of an agricultural vehicle comprising:

receiving a state signal relating to a parameter of the agricultural vehicle;

acquiring, based on the state signal, an operational image of an agricultural operation of the agricultural vehicle;

generating a disparity image from the operational image;

determining a disparity of the disparity image; and displaying a disparity indicator relating to the disparity of the disparity image to an operator of the agricultural vehicle, wherein the disparity is a disparity health of the disparity image, the disparity health determined by segmenting the disparity image into cells and comparing the cells against a disparity health threshold.

2. The method of claim 1 wherein the state signal is provided over a common area network on the agricultural vehicle, the state signal relating to at least one of elevator state, elevator performance and agricultural vehicle yaw.

3. The method of claim 1 wherein the state signal is compared to a threshold and wherein if the state signal exceeds the threshold the operational image is not acquired and if the signal falls below the threshold the operational image is acquired.

4. The method of claim 1 wherein the state signal is compared to a threshold and wherein if the state signal falls below the threshold the operational image is not acquired and if the state signal exceeds the threshold the operational image is acquired.

5. The method of claim 1 wherein the disparity indicator notifies an operator that a lens of the stereo vision system is dirty.

6. The method of claim 1 wherein the disparity indicator notifies an operator of under exposure condition impacting the stereo vision system.

7. The method of claim 1 wherein the disparity indicator notifies an operator of over exposure condition impacting the stereo vision system.

8. The method of claim 1 wherein the disparity indicator notifies an operator that the stereo vision system is functioning normally.

9. The method of claim 1 wherein the operational image of the agricultural operation comprises at least a left image from a left camera and a right image a right camera of the stereo vision system.

10. The method of claim 1 wherein the agricultural vehicle is a sugarcane harvester and the stereo vision system comprises at least one camera associated with an elevator of the sugarcane harvester.

11. The method of claim 2 wherein the elevator performance relates to whether the elevator is empty.

12. The method of claim 2 wherein the elevator state relates to whether or not the elevator is in a steady state.

13. The method of claim 2 wherein agricultural vehicle yaw relates to whether or not the yaw of the agricultural vehicle is changing.

14. The method of claim 1 wherein the disparity indicator relates to at least one of a cleanliness indicator of the stereo vision system, an under exposure condition impacting the stereo vision system and an over exposure condition impacting the stereo vision system.

15. A system for monitoring an agricultural vehicle comprising:

a communication network configured to relay a communication signal relating to a parameter of the agricultural vehicle;

a stereo vision system for generating an operational image of an agricultural operation of the agricultural vehicle; and a controller for receiving the communication signal and the operational image, the controller generating, based in part on the communication signal, a disparity image from the operational image, generating a disparity of the disparity image, and providing a disparity indicator relating to the disparity image to an operator of the agricultural vehicle, wherein the disparity is a disparity health of the disparity image, the disparity health determined by segmenting the disparity image into cells and comparing the cells against a disparity health threshold.

16. An apparatus for monitoring an agricultural vehicle comprising:

a communication network configured to relay a communication signal relating to a parameter of the agricultural vehicle;

a stereo vision system for generating an operational image of an agricultural operation of the agricultural vehicle; and a controller for receiving the communication signal and the operational image, the controller generating, based in part on the communication signal, a disparity image from the operational image, generating a disparity of the disparity image, and providing a disparity indicator relating to the disparity image to an operator of the agricultural vehicle, wherein the disparity is a disparity health of the disparity image, the disparity health determined by segmenting the disparity image into cells and comparing the cells against a disparity health threshold.

* * * * *